Patented Apr. 20, 1954

2,676,138

UNITED STATES PATENT OFFICE 2,676,138

STABILIZED PAPAIN COMPOSITION AND ITS PREPARATION

Emil T. Hinkel, Jr., Elsmere, N. Y., assignor to Sterling Drug Inc., New York, N. Y., a corporation of Delaware No Drawing. Application May 31, 1951, Serial No. 229,283

10 Claims. (Cl. 195—63)

This invention relates to a stabilized papain composition and to a process of its preparation.

Papain is the dried whole latex obtained primarily from the green fruit of Carica papaya L. Because it contains powerful proteolytic enzymes, papain has found commercial usage as an aid to protein digestion. However, the relatively low proteolytic activities of some commercial papain preparations, compared to that found in the fresh latex, indicates that a large loss of proteolytic enzymes has taken place. Moreover, papain has been known to lose proteolytic activity on aging, thereby resulting in a progressive deterioration in the potencies of stocks of this material. These losses in potency—from fresh latex to papain and in the papain on standing—represent a large economical loss.

I have now found that by suitable treatment of the fresh latex before drying that I can obtain not only a papain preparation that contains proteolytic activity in amounts equal to that of the fresh latex, but also a papain composition that retains its initially high proteolytic activity over long periods of time under normal storage conditions.

I have found that such a stabilized papain composition can be prepared by treating the fresh latex with a minor quantity, preferably from 0.1 to 3 per cent, of sodium bisulfite prior to drying. Moreover, I have found that this preservation of proteolytic activity is somewhat further enhanced by incorporating with the fresh latex and the minor quantity of sodium bisulfite, a minor amount of a phenolic compound such as thymol. Papain compositions prepared in this manner still retain all of their original proteolytic activity after two to four years of normal storage (room temperature in screw-cap glass containers) as contrasted to a 25-50 per cent loss in activity shown by unstabilized papain preparations similarly stored for only two years.

My invention is illustrated as follows:

To a sample of fresh papaya latex was added, with stirring, 2 per cent by weight of sodium bisulfite and stirring was continued until the bisulfite dissolved. The resulting mixture was dried in a hot-air oven at 55° C. There was thus obtained a papain composition which possessed the same proteolytic potency originally possessed by the fresh latex and, moreover, which showed no loss in proteolytic activity after approximately two years of storage at room temperature.

In another experiment there was obtained papain compositions having high proteolytic activity compared to the proteolytic activity of the fresh latex by incorporating in samples of fresh latex the following respective quantities (percentage by weight of latex) of chemicals: 0.5 per cent sodium bisulfite + 0.2 per cent powdered thymol; 0.1 per cent each of sodium bisulfite and powdered thymol; and 0.1 per cent of sodium bisulfite. Satisfactory results were obtained when these treated latex mixtures were handled in the following ways: allowed to stand three hours at room temperature and then dried at 50° C.; allowed to stand twenty-four hours at room temperature and then dried at 70° C.; allowed to stand twenty-seven hours at room temperature and then dried at 50° C.

Alternatively, the above papain preparations can be prepared by drying the treated latex mixtures in vacuo from freezing temperatures up to about 75° C. Furthermore, fresh papaya latex that has been preserved by freezing and stored in the frozen condition for periods of at least four years, can be used as fresh latex for the purposes of my invention.

I claim:

1. A stable, dry papain composition of high proteolytic activity having incorporated therein a minor quantity of sodium bisulfite.

2. A stable, dry papain composition of high proteolytic activity having incorporated therein a minor quantity each of sodium bisulfite and a phenol.

3. A stable, dry papain composition of high proteolytic activity having incorporated therein a minor quantity each of sodium bisulfite and thymol.

4. A stable, dry papain composition of high proteolytic activity having incorporated therein from 0.1 to 3 per cent sodium bisulfite based on the fresh latex before drying.

5. A stable, dry papain composition of high proteolytic activity having incorporated therein 0.5 per cent sodium bisulfite and 0.2 per cent thymol each percentage based on the fresh latex before drying.

6. A process for the preparation of stable, dry papain composition having high proteolytic activity which comprises treating fresh latex with a minor quantity of sodium bisulfite and drying the resulting mixture.

7. A process for the preparation of a stable, dry papain composition having high proteolytic activity which comprises treating fresh latex with a minor quantity each of sodium bisulfite and a phenol and drying the resulting mixture.

8. A process for the preparation of a stable, dry papain composition having high proteolytic activity which comprises treating fresh latex with a minor quantity each of sodium bisulfite and thymol and drying the resulting mixture.

9. A process for the preparation of a stable, dry papain composition having high proteolytic activity which comprises treating fresh latex with 0.1 to 3 per cent sodium bisulfite and drying the resulting mixture.

10. A process for the preparation of a stable, dry papain composition having high proteolytic activity which comprises treating fresh latex with 0.5 per cent sodium bisulfite and 0.2 per cent thymol and drying the resulting mixture at a temperature not exceeding 75° C.

References Cited in the file of this patent

UNITED STATES PATENTS

| Number | Name | Date |
|---|---|---|
| 1,460,736 | Takamine | July 3, 1923 |
| 2,257,218 | Balls et al. | Sept. 30, 1941 |
| 2,313,875 | Jansen et al. | Mar. 16, 1943 |
| 2,464,200 | Hall | Mar. 15, 1949 |

FOREIGN PATENTS

| Number | Country | Date |
|---|---|---|
| 546,145 | Germany | Feb. 25, 1932 |

OTHER REFERENCES

Tauber, Experimental Enzyme Chemistry 1936, Burgess Pub. Co., Mpls., Minn., page 44.

Gregory, Uses and Applications of Chemicals and Related Materials, 1939; Reinhold Publishing Corporation, 330 West Forty-second Street, New York, page 528.